(12) United States Patent
Matsumoto et al.

(10) Patent No.: US 6,370,319 B1
(45) Date of Patent: Apr. 9, 2002

(54) DIGITAL RECORDING APPARATUS AND METHOD

(75) Inventors: Seiji Matsumoto; Masamichi Furukawa, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/318,490

(22) Filed: May 25, 1999

(30) Foreign Application Priority Data

May 26, 1998 (JP) .......................................... 10-161362

(51) Int. Cl.[7] .............................................. H04N 5/91
(52) U.S. Cl. .......................... 386/94; 382/100; 713/176
(58) Field of Search ................................ 386/1, 46, 94; 360/60; 382/100, 232, 276; 399/366; 713/161, 176

(56) References Cited

U.S. PATENT DOCUMENTS

| | | | | |
|---|---|---|---|---|
| 5,809,139 A | * | 9/1998 | Girod et al. ................ | 713/176 |
| 6,175,639 B1 | * | 1/2001 | Satoh et al. ................ | 382/100 |
| 6,209,092 B1 | * | 3/2001 | Linnartz ..................... | 713/176 |
| 6,246,802 B1 | * | 6/2001 | Fujihara et al. ............. | 382/276 |

\* cited by examiner

*Primary Examiner*—Wendy R. Garber
*Assistant Examiner*—Christopher Onuaku

(74) *Attorney, Agent, or Firm*—Pillsbury Winthrop LLP (57) ABSTRACT

A digital recording apparatus receives an analog signal containing picture and/or voice information, through an analog transmission line, and digitally records the analog signal. The analog signal is digitally recorded in a form containing electronic watermark information within a first portion of the analog signal containing the picture and/or voice information while adding copy control information indicating permission of free copying to a second portion of the analog signal not containing the picture and/or voice information when the detected electronic watermark information indicates permission of free copying. Digital recording of the analog signal is prohibited when the detected electronic watermark information indicates prohibition of copying, and the analog signal is digitally recorded with the copy control information indicating prohibition of subsequent recording added to the second portion of the analog signal when no electronic watermark information is detected. A digital recording apparatus is connected to a receiver system that receives a digital broadcasting wave signal containing picture and/or voice information, for digitally recording the received wave signal. The received wave signal is digitally recorded in a form containing electronic watermark information and copy control information, according to a determined copy restriction level when the electronic watermark information is detected in the received wave signal, and the received wave signal is digitally recorded in a form containing the copy control information, according to the copy restriction level when no electronic watermark information is detected.

10 Claims, 4 Drawing Sheets

DIGITAL RECORDING APPARATUS AND METHOD

BACKGROUND OF THE INVENTION

1. Field of the Invention

The present invention relates to a digital recording apparatus, such as a DVD (digital video disc) recording/reproduction apparatus and a digital VCR, and a digital recording method. In particular, this invention is concerned with such digital recording apparatus and method that can effectively prevent unauthorized copying that is not intended by a creator or producer of data, while limitedly permitting digital copying.

2. Prior Art

Conventionally, a digital data transmission system has been proposed, in which digital recording/reproduction apparatuses, such as optical disc (e.g., DVD) reproduction apparatus, digital TV, digital VCR, and others, are connected to each other via an IEEE-1394 bus that serves as an intelligent interface, so that data contents, such as pictures and music, are transmitted and received between these digital apparatuses. When digital data is transmitted and received between these apparatuses, the system checks if each of the apparatuses operates in a manner as intended by the creator or producer who created the contents of the data, and, if any apparatus does not operate as intended by the creator, data transfer is prohibited, to thereby prevent the user from illegally copying the picture and/or music contents against the intention of the creator.

Digital main data to be transmitted contains copy control information called "CCI". The CCI consists of two bits, namely, "00", "10" or "11", where "00" indicates permission of free copying, "10" indicates permission of one-time copying, and "11" indicates prohibition of copying.

Upon transmission of digital data, the transmitter-side apparatus initially checks the CCI to determine its copy restriction level for the contents of the digital data, and also checks, on the IEEE-1394 bus, whether the receiver-side apparatus operates in a manner as intended by the content creator. If complete authentication is established between the receiver-side apparatus and the transmitter-side apparatus, the contents is encrypted and transmitted from the transmitter-side apparatus. In this case, where the CCI information of the digital data transmitted from the transmitter-side apparatus is, for example, "10", and the receiver-side apparatus is a sound recording apparatus, the CCI is rewritten into "11" and thus recorded during copying of the digital data. As a result, second and subsequent copying actions are prohibited, and thus only one-generation copying is realized.

As another method for preventing unauthorized copying by digital picture apparatuses, it has been proposed to use electronic watermark information (generally called "watermark"). In this method, watermark information may be directly added to a non-obvious or low-intensity portion of the waveform of a picture signal, or may be embedded into a particular frequency component of frequency conversion information of the original signal. By providing the watermark with information on permission/prohibition of copying, the watermark is able to indicate whether free copying is permitted, or only reproduction of the data is permitted, for example.

While the above description is related to the system using a digital transmission line called IEEE-1394 bus, the contents to be recorded is also often transmitted through an ordinary analog signal transmission line, to a digital recording apparatus. In this case, too, it is naturally desirable to employ a digital recording method that effectively prevents unauthorized copying that is not intended by the data producer or creator while limitedly permitting digital copying.

The conventional system using the digital bus, however, has not taken account of the case where picture/music signals are transmitted in the form of analog signals to a digital recording apparatus. In the case of digital recording of data transmitted in the form of analog signals, matching of the analog signal transmission with the system using the digital bus has not been taken into consideration.

When the known digital recording apparatus receives digital broadcasting waves containing CCI for copy restriction, and rewrites the CCI from "10" (indicating permission of one-time copying) into "11" (indicating prohibition of copying), for example, it is relatively easy to rewrite "10" into "00" (indicating permission of free copying) through two-bit manipulation, thus causing a problem that unauthorized copying may be done without difficulty.

In the method using watermarks, on the other hand, watermark information is distributed over a relatively wide range of picture and/or voice information contained in main data of digital data to be transmitted, and it is therefore difficult for the receiver-side apparatus to rewrite this information. If the watermark information is to be rewritten on the user level, the receiver-side apparatus needs to be provided with a considerably large circuit. This is advantageous over the use of CCI in terms of prevention of unauthorized or illegal copying. However, since the watermark cannot be easily rewritten as described above, it is rather difficult to permit one-time copying by rewriting or changing the flag (i.e., watermark) as in the case where CCI is used.

To make up for the impossibility or difficulty of rewriting of watermarks, an attempt has been made to introduce the concept of media marks that are incorporated into only original contents, but not generated or output to reproduced signals. It is, however, technically difficult to incorporate such marks into analog signals, and it is also rather difficult to introduce the concept into such media as digital broadcasting, which have been already put into practice.

SUMMARY OF THE INVENTION

It is therefore an object of the present invention to provide a digital recording apparatus and a digital recording method that are able to prevent unauthorized digital copying more effectively, while allowing the use of different forms or levels of copy restriction, in a system that transmits analog signals or digital broadcasting waves.

To attain the above object, according to a first aspect of the present invention, there is provided a digital recording apparatus that receives an analog signal containing at least one of picture and voice information, through an analog transmission line, and digitally records the analog signal, comprising an electronic watermark information detecting device that detects presence and content of electronic watermark information contained in a first portion of the received analog signal comprising the at least one of picture and voice information, the electronic watermark information indicating permission of free copying or prohibition of copying, a recording device that digitally records the analog signal received through the analog transmission line, and a control device that controls the recording device so as to allow the recording device to digitally record the analog signal in a form containing the electronic watermark information within the first portion of the analog signal while adding copy control information indicating permission of free copying to a second portion of the analog signal that does not include the at least one of picture and voice information when the electronic watermark information detected by the electronic watermark information detecting device indicates permission of free copying, prohibit the recording device from digitally recording the received analog signal when the electronic watermark information detected by the electronic watermark information detecting device indicates prohibition of copying, and allow the recording device to digitally record the received analog signal while adding copy control information indicating prohibition of subsequent recording to the second portion of the analog signal when no electronic watermark information is detected by the electronic watermark information detecting device.

To attain the above object, according to a second aspect of the present invention, there is provided a digital recording apparatus connected to a receiver system that receives a digital broadcasting wave signal containing at least one of picture and voice information, for digitally recording the digital broadcasting wave signal received by the receiver system, comprising an electronic watermark information detecting device that detects presence and content of electronic watermark information contained in a first portion of the digital broadcasting wave signal comprising the at least one of picture and voice information, the electronic watermark information indicating permission of free copying or prohibition of copying, a copy control information determining device that determines a content of copy control information that indicates a copy restriction level, the copy control information being contained in a second portion of the received digital broadcasting wave signal that does not include the at least one of picture and voice information, and a recording device that digitally records the received digital broadcasting wave signal, and a control device that controls the recording device so as to digitally record the received digital broadcasting wave signal in a form containing the electronic watermark information and the copy control information, according to the copy restriction level determined by the copy control information determining device when the electronic watermark information indicating permission of free copying or prohibition of copying is detected by the electronic watermark information detecting device, and digitally record the received digital broadcasting wave signal in a form containing the copy control information, according to the copy restriction level determined by the copy control information determining device when the electronic watermark information detecting device detects no electronic watermark information in the received digital broadcasting wave signal.

Preferably, the copy control information indicates one of copy restriction levels representing permission of free copying, permission of one-generation copying, and prohibition of copying.

In a preferred form of the second aspect, the control device controls the recording device such that the recording device digitally records the received digital broadcasting wave signal along with the electronic watermark information and the copy control information both indicating permission of free copying when the electronic watermark information detected by the electronic watermark information detecting device indicates permission of free copying and the copy restriction level determined by the copy control information determining device indicates permission of copying, the recording device digitally records the received digital broadcasting wave signal along with the electronic watermark information while changing the copy control information into that indicating prohibition of copying when the electronic watermark information detected by the electronic watermark information detecting device indicates prohibition of copying and the copy restriction level determined by the copy control information determining device indicates permission of one-generation copying, and the recording device is inhibited from digitally recording the received digital broadcasting wave signal when the electronic watermark information detected by the electronic watermark information detecting device indicates prohibition of copying and the copy restriction level determined by the copy control information determining device indicates prohibition of copying.

In another preferred form of the second aspect, the control device controls the recording device such that the recording device digitally records the received digital broadcasting wave signal without electronic watermark information while containing the copy control information indicating permission of copying when no electronic watermark information is detected by the electronic watermark information detecting device and the copy restriction level determined by the copy control information determining device indicates permission of copying, the recording device digitally records the received broadcasting signal without electronic watermark information while changing the copy control information into that indicating prohibition of copying when no electronic watermark information is detected by the electronic watermark information detecting device and the copy restriction level determined by the copy control information determining device indicates permission of one-generation copying, and the recording device is inhibited from digitally recording the digital broadcasting wave signal when no electronic watermark information is detected by the electronic watermark information detecting device and the copy restriction level determined by the copy control information determining device indicates prohibition of copying.

To attain the above object, the present invention also provides a digital recording method of receiving an analog signal containing at least one of picture and voice information, through an analog transmission line, and digitally recording the analog signal, comprising the steps of detecting presence and content of electronic watermark information contained in a first portion of the received analog signal comprising the at least one of picture and voice information, the electronic watermark information indicating permission of free copying or prohibition of copying, digitally recording the received analog signal in a form containing the electronic watermark information within the first portion of the analog signal while adding copy control information indicating permission of free copying to a second portion of the analog signal that does not include the at least one of picture and voice information when the electronic watermark information detected in the step of detecting electronic watermark information indicates permission of free copying, inhibiting digital recording of the received analog signal when the electronic watermark information detected in the step of detecting electronic watermark information indicates prohibition of copying, and digitally recording the received analog signal while adding copy control information indicating prohibition of subsequent recording to the second portion of the analog signal when no electronic watermark information is detected in the step of detecting electronic watermark information.

To attain the above object, the present invention further provides a digital recording method of digitally recording a digital broadcasting wave signal that is received by a receiver system, the digital broadcasting wave signal containing at least one of picture and voice information, comprising the steps of detecting presence and content of electronic watermark information contained in a first portion of the received digital broadcasting wave signal comprising the at least one of picture and voice information, the electronic watermark information indicating permission of free copying or prohibition of copying, determining copy control information that indicates a copy restriction level and is contained in a second portion of the received digital broadcasting wave signal that does not include the at least one of picture and voice information, and digitally recording the received digital broadcasting wave signal in a form containing the electronic watermark information and the copy control information, according to the copy restriction level determined in the step of determining copy control information when the electronic watermark information indicating permission of free copying is detected in the step of detecting electronic watermark information, and digitally recording the digital broadcasting wave signal in a form containing the copy control information, according to the copy restriction level determined in the step of determining copy control information when no electronic watermark information is detected in the received digital broadcasting wave signal in the step of detecting electronic watermark information.

In the digital recording apparatus and method according to the present invention, no matter whether picture and/or voice information is received in the form of an analog signal, or in the form of a digital signal received as digital broadcasting waves, electronic watermark information that is difficult to rewrite is included in a portion of the signal comprising the picture and/or voice information, so that copy restriction designated by the watermark information can be imposed in accordance with the intention of the contents supplier. The digital recording apparatus freely performs copying operations when the electronic watermark information indicates permission of free copying, and at the same time adds copy control information indicating permission of free copying to the signal. When the electronic watermark information indicates prohibition of copying, the apparatus is inhibited from copying or recording the received signal. If no electronic watermark information is detected, which is interpreted as permitting only one-generation copying, the recording apparatus records the received signal, while adding copy control information indicating prohibition of copying, to the recorded signal. While the copy control information may be easily rewritten, this information is recorded along with the electronic watermark information that is difficult to rewrite where any electronic watermark information is detected. Thus, subsequent copying will be prohibited even if the copy control information were rewritten with some intention.

The above and other objects, features, and advantages of the invention will become more apparent from the following detailed description taken in conjunction with the accompanying drawings.

DETAILED DESCRIPTION OF THE PREFERRED EMBODIMENTS

The present invention will be described in detail with reference to the accompanying drawings showing preferred embodiments thereof.

Figure 1:
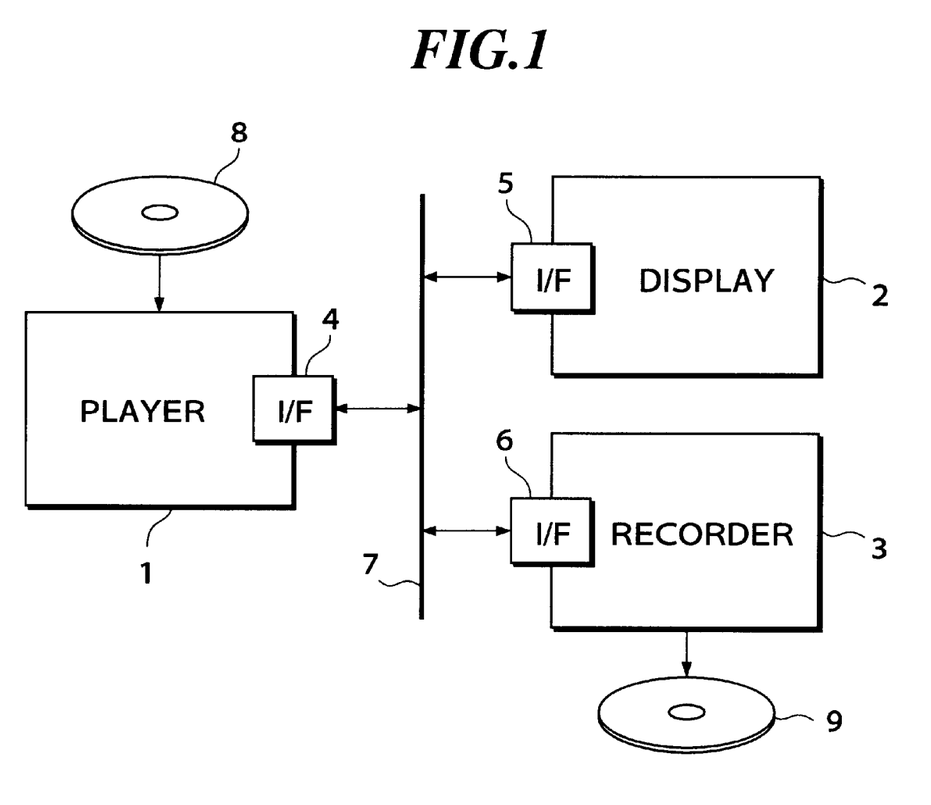
FIG. 1 is a block diagram showing the construction of a reproduction/recording system of digital apparatuses including a digital recording apparatus according to one embodiment of the present invention.

FIG. 1 shows the construction of a reproducing/recording system including a digital apparatuses according to one embodiment of the present invention.

In the system shown in FIG. 1, a transmitter-side apparatus in the form of a DVD player 1 and receiver-side apparatuses in the form of a display 2 and a DVD recorder 3 are connected to each other through respective analog input/output interfaces 4, 5, 6 and an analog transmission line 7. The DVD player 1 transmits analog-signal outputs generated by reproducing picture and/or music contents recorded in a DVD 8 as a transmission source, to the display 2 and recorder 3, via the transmission line 7. The recorder 3 digitally records the received analog signals into a DVD 9, so long as digital copying is permitted.

The player 1 checks if the DVD 8 to be played back is an authorized medium or not, (i.e., medium containing data that has been recorded under authorization), using two types of information recorded on the DVD 8, namely, CCI (copy control information) imprinted on a portion of the disc containing no picture/voice information, and watermark (electronic watermark information) imprinted on a portion of the disc containing picture/voice information.

Figure 2:
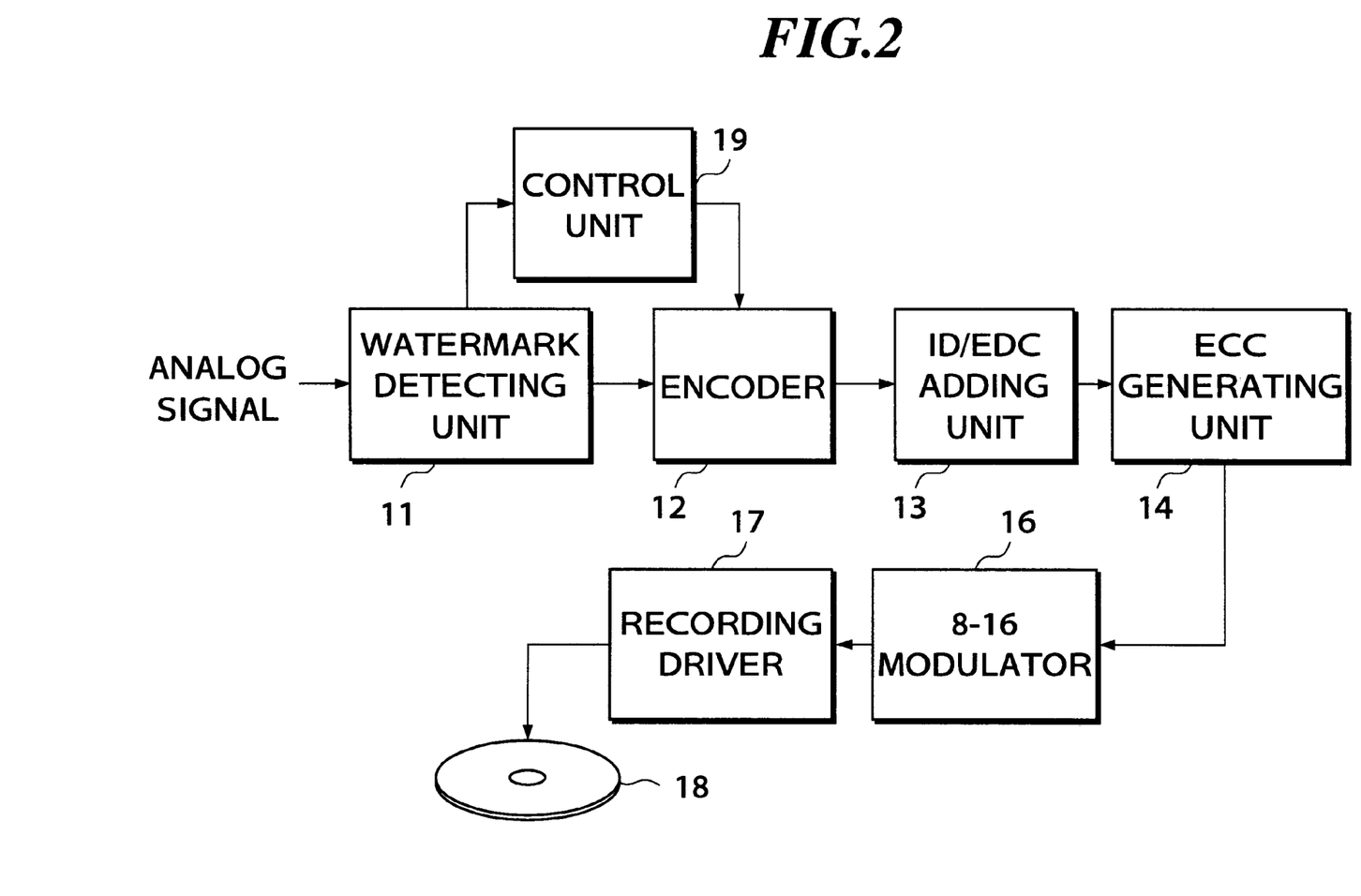
FIG. 2 is a block diagram showing the construction of a recorder included in the system of FIG. 1.

FIG. 2 shows the construction of the recorder 3 of FIG. 1. While the recorder 3 shown in FIG. 2 takes the form of a DVD recorder, by way of example, the recorder 3 may be another type of digital recording apparatus such as a digital VCR.

The recorder 3 includes a watermark detecting unit 11 that receives an analog signal through the transmission line 7, and detects a watermark, if any, that has been embedded in the analog signal at its portion where picture and/or voice signals are unnoticeable, e.g., a portion having a large difference in the brightness or intensity level and providing a masking effect. The watermark may be embedded into a particular frequency of a signal obtained through the Fourier transformation of the original signal. The recorder 3 further includes an encoder 12 adapted for compressing and encoding the analog signal received from the watermark detecting unit 12, and a control unit 19 that permits or prohibits encoding, depending upon the presence and content of the watermark detected by the watermark detecting unit 11. Where encoding is permitted by the controller 19, the data is encoded within the encoder 12 and at the same time a CCI is added to the data under control of the control unit 19. In the next stage, an ID/ERD (Identification/Error Detecting Code) adding unit 13 adds an ID and an error detecting code to the signal received from the encoder, and then an ECC (Error Correction Code) generating unit 14 generates an error correction code based on the data received from the ID/ERD adding unit 13, and adds the error correction code to the data. The data provided with the error correction code is then modulated by an EFM (Eight-to-Fourteen) modulator 16 from 8 to 16 (DVD) or from 8 to 14 (CD), and then recorded by a recording driver 17 on a disc (DVD) 18.

Referring to Table given below, there will be explained recording or copy control performed on the recorder 3 as described above. The items denoted by "Analog Input" and "Broadcasting Waves" in the lower part of Table are associated with the recording and copy control methods according to the present invention. The other items denoted by "Disc with Media Mark" and "Disc without Media Mark" in the upper part of Table are listed only for reference, which are related to reproduction, recording and copy control methods employed in a system using a digital bus capable of keeping compatibility with the digital recording apparatus according to the present invention.

The watermark is set to "00" if free copying is permitted, and set to "11" if copying is prohibited or unauthorized. CCI is set to "00" if free copying is permitted, set to "11" if copying is prohibited, and set to "10" if only one-generation copying is permitted, namely, copying is permitted only once. The watermark is imprinted on the recording medium during recording provided such imprinting is possible on a hardware system or apparatus.

TABLE

| Input State | Flag of Input Contents | | Input Source | | | Playback Control | Flag Set upon Reproduction Output | | Recording Control | After Recording | | Note |
|---|---|---|---|---|---|---|---|---|---|---|---|---|
| | Watermark | CCI | System | Legality | Summary | | Watermark | CCI | | Watermark | CCI | |
| Disc with Media Mark | 11 | 11 | new | legal | recoding prohibited | ○ | 11 | 11 | x | — | — | 1* |
| | 11 | 10 | new | legal | one generation copying permitted | ○ | 11 | 10 | ○ | 11 | 11 | 2* |
| | 11 | 00 | new | illegal | unauthorized alteration | x | | | x | — | — | 3* |
| | 00 | 11 | new | illegal | unauthorized alteration | x | | | | — | — | 4* |
| | 00 | 10 | new | illegal | unauthorized alteration | x | | | | — | — | 4* |
| | 00 | 00 | new | legal | free copying permitted | ○ | | | ○ | 00 | 00 | 5* |
| | none | 11 | new | illegal | unauthorized alteration | x | 00 | 00 | — | — | — | 6* |
| | none | 10 | new | illegal | unauthorized alteration | x | | | — | — | — | 6* |
| | none | 00 | new | illegal | unauthorized alteration | x | | | — | — | — | 6* |
| Disc without Media Mark = Digital Input | 11 | 11 | new | legal | copying of disc which one generation copying is permitted | ○ | 11 | 11 | — | — | — | 7* |
| | 11 | 10 | new | illegal | unauthorized alteration | x | | | x | — | — | 8* |
| | 11 | 00 | new | illegal | unauthorized alteration | x | | | x | — | — | 8* |
| | 00 | 11 | new | illegal | unauthorized alteration | x | | | x | — | — | 9* |
| | 00 | 10 | new | illegal | unauthorized alteration | x | | | x | — | — | 9* |
| | 00 | 00 | new | legal | copying of disc for which free copying is permitted | ○ | 00 | 00 | ○ | 00 | 00 | 10* |
| Disc without Media Mark = Digital Input | none | 11 | old | legal | copying prohibited | ○ | none | 11 | x | none | 11 | 11* |
| | none | 10 | old | legal | one generation copying permitted | ○ | none | 10 | ○ | none | 11 | 12* |
| | none | 00 | old or personally produced disc | legal | free copying is permitted | ○ | none | 00 | ○ | none | 00 | 12* |
| Analog Input | 11 | — | new | legal | copying prohibited | ○ | 11 | 11** | x | — | — | 13* |
| | 00 | — | new | legal | free copying permitted | ○ | | 00** | ○ | 00 | 00 | 13* |
| | none | — | old generation or personally produced disc | legal + illegal (old disc) | one generation copying permitted | ○ | none | 10** | ○ | none | 11 | 14* |
| Broadcast Waves | 11 | 11 | new system | legal | copying prohibited | ○ | 11 | 11 | x | — | — | 15* |
| | 11 | 10 | new system | legal | one generation copying permitted | ○ | 11 | 10 | ○ | 11 | 11 | 15* |
| | 00 | 00 | new system | legal | free copying permitted | ○ | 00 | 00 | ○ | 00 | 00 | 15* |
| | none | 11 | current system | legal | copying pro- | ○ | none | 11 | x | — | — | 15* |

TABLE-continued

| Input State | Flag of Input Contents | | Input Source | | | Playback Control | Flag Set upon Reproduction Output | | Recording Control | After Recording | | Note |
| --- | --- | --- | --- | --- | --- | --- | --- | --- | --- | --- | --- | --- |
| | Watermark | CCI | System | Legality | Summary | | Watermark | CCI | | Watermark | CCI | |
| | none | 10 | current system | legal | hibited one generation copying permitted | ○ | none | 10 | ○ | none | 11 | 15* |
| | none | 00 | current system | legal | free copying permitted | ○ | none | 00 | ○ | none | 10 | 15* |

"11", "00", "10**" are treated as "11", "00" and "10", respectively.

Notes:
1* Authorized disc from which recording is prohibited.
2* Authorized, original disc for which one-generation copying is permitted
3* Disc subjected to unauthorized alteration, which cannot be played back on a new system
4* Not included among appropriate combinations
5* Original disc permitted free copying
6* Meaningless combination (alteration)
7* Recorded disc having contents for which one-generation copying is permitted: this may be unauthorized copy disc
8* Unauthorized copy disc
9* Meaningless combination (alteration)
10* Copy disc with contents copied from a disc that permits free copying
11* Conventional disc that is weakly protected against unauthorized use or copying (using only CCI)
12* Conventional disc that is weakly protected against unauthorized use or copying
13* Copy control may be performed on analog signal
14* Only one-generation copying is permitted (equivalent to SCMS)
15* Basically, no inappropriate signal is generated.

The watermark, when it is contained in an analog input signal, is represented by either "00", indicating permission of copying, or "11" indicating prohibition of copying. Where the watermark is "00", free copying is permitted, and the encoder 12 is allowed to perform an encoding operation. In this case, the analog input signal contains no CCI, but CCI having a two-bit value of "00", is recorded, along with the watermark "00". Where the watermark is "11", copying is prohibited, and therefore the encoder 12 is inhibited from performing an encoding operation. When the analog input signal contains no watermark, on the other hand, the input source may be considered as a conventional disc that was produced at the time when no concept of watermarking was present, or a personally produced disc that was produced by an individual, or the like. In this case, the disc is treated such that only one-generation copying is permitted. Namely, copying is permitted only one time, but second and subsequent copying actions are prohibited by setting CCI to "11".

In the above description, the analog signal to be recorded is obtained by reproducing data stored in the DVD 8. It is, however, possible to apply the same copy control method to other analog signals, such as those directly received from microphones, and the like, other than those recorded in recording media.

Where the input source contains a watermark, the recorded disc 18 is provided with the watermark as well as CCI, which is difficult to rewrite, and thus the intention of the creator who created the contents can be satisfactorily reflected.

Figure 3:
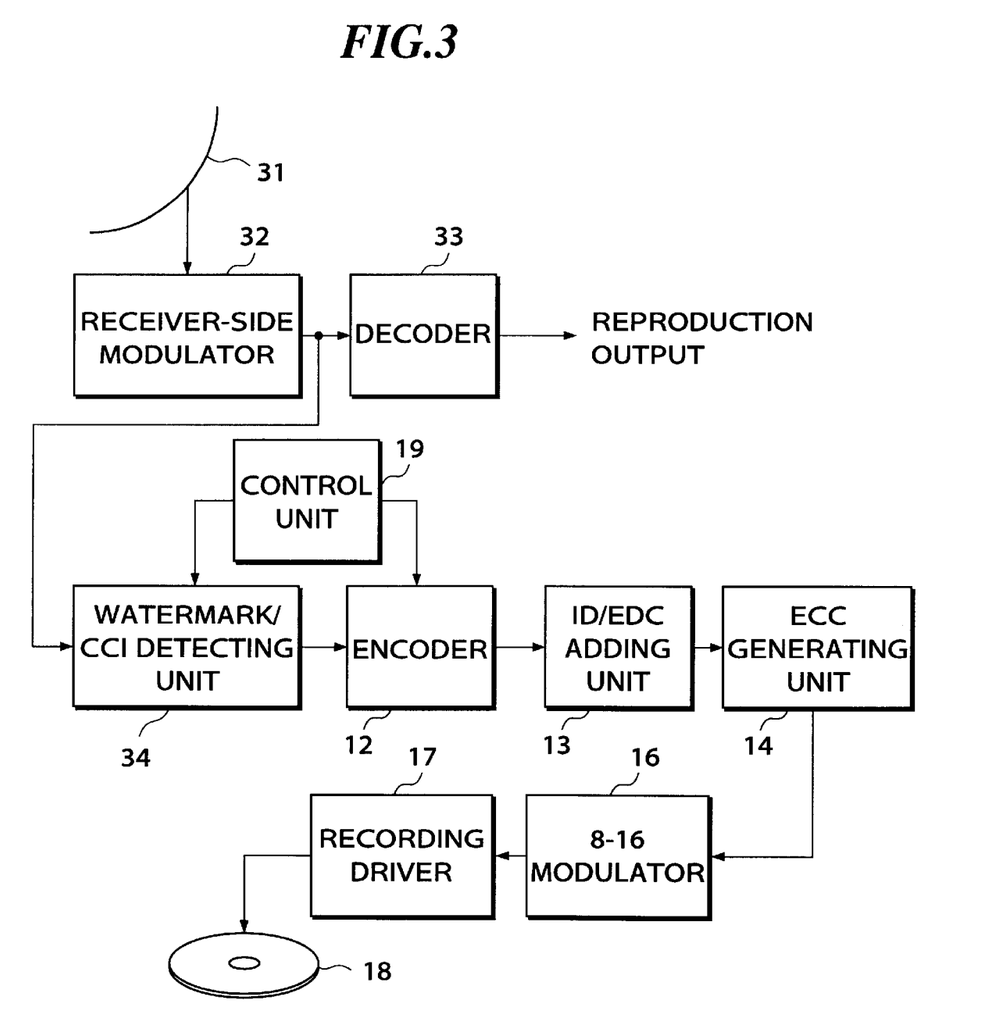
FIG. 3 is a block diagram showing the construction of a system for receiving and recording digital broadcasting waves, including a digital recording apparatus according to another embodiment of the present invention.

FIG. 3 shows the construction of a digital recording apparatus that receives digital broadcasting waves, and performs digital recording, according to another embodiment of the present invention.

A digital signal received via a BS antenna 31 is demodulated by a receiver-side demodulator 32, decoded by a decoder 33, and then generated as a reproduction output to a display (not shown), or the like. The received digital signal that has been demodulated contains a watermark and CCI, which are respectively detected by a watermark/CCI detecting unit 34. Depending upon the presence and content of the watermark and the content of the CCI which are detected by the watermark/CCI detecting unit 34, the control unit 19 permits or prohibit encoding by the encoder 12, and the CCI is set or changed during encoding. The following operations are similar to those described referring to FIG. 2, and will not be explained herein.

In the above case, copying is controlled based on the watermark and CCI contained in the received digital signal, as shown in Table. Where a watermark is present, copying is prohibited if both of the watermark and CCI are "11", and copying is freely permitted if both of the watermark and CCI are "00". Thus, the received digital signal is copied and recorded upon detection of the watermark and CCI each having "00". Where the watermark is "11" and the CCI is "10", only one-generation copying is permitted, and thus the received digital signal is copied in the form containing the watermark, and recorded such that both of the watermark and CCI are "11".

Where no watermark is detected, copy control is performed in substantially the same manner as described above, based on the two-bit value of the CCI. In this case, however, no watermark is recorded.

Figure 4:
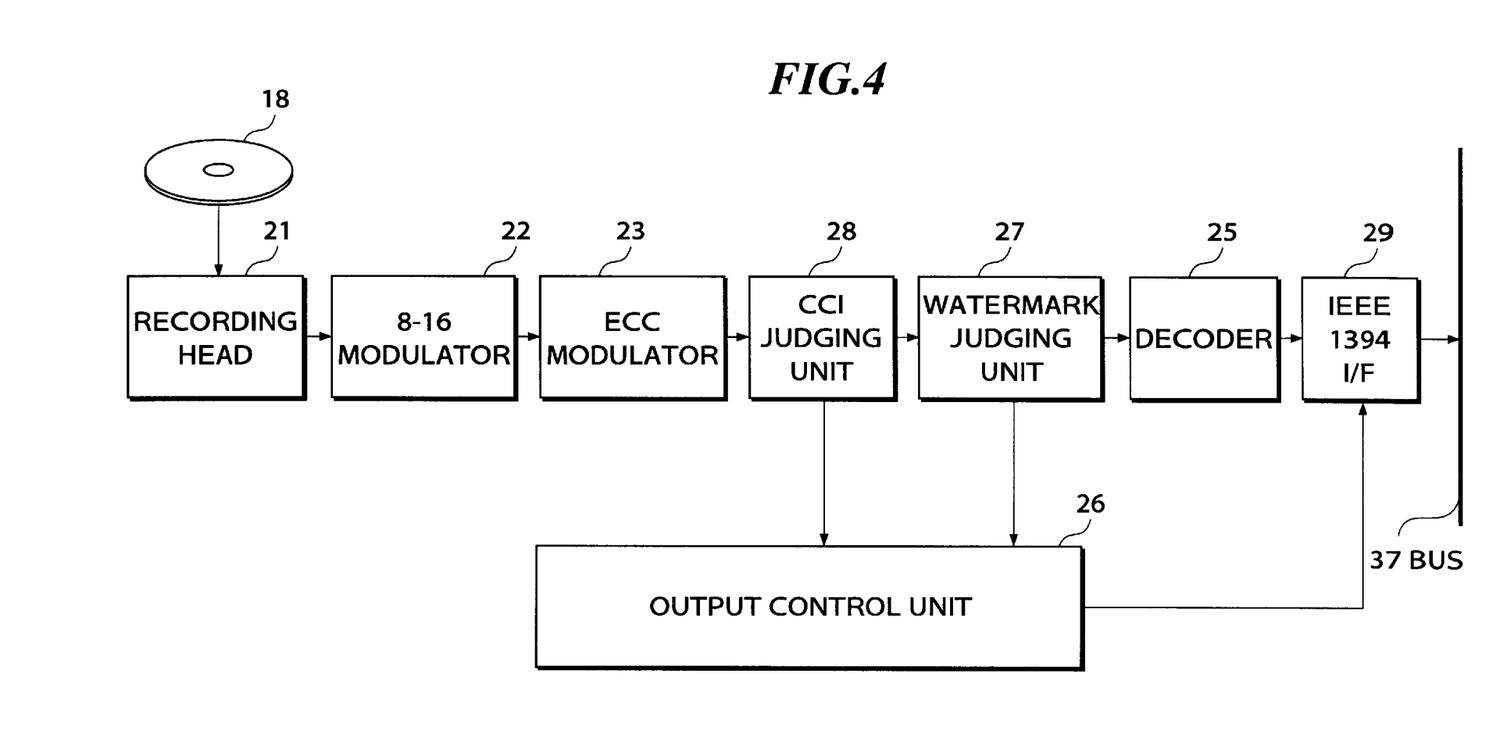
FIG. 4 is a block diagram showing the construction of a player that reproduces data recorded on a disc by the recording apparatus of the present invention.

The data recorded on the disc 18 in the above manner is reproduced by a player as shown in FIG. 4 by way of example.

The player includes a reading head 1 that reads out data recorded on the DVD 8, an EFM demodulator 22 that demodulates the data read by the reading head 1, and an ECC demodulator 23 that performs error correction processing, by extracting an error correction code from the data demodulated by the EFM demodulator 22, and detecting and correcting errors contained in the data, based on the extracted error correction code. A CCI judging unit 28 and a watermark judging unit 27 then extract a watermark and CCI, respectively, from the data demodulated by the ECC demodulator 23, and makes judgments on the detected watermark and CCI. The data is then decoded by a decoder 25. During decoding, an output control unit 26 controls outputs of the decoder 25, based on the results of judgments made by the watermark and CCI judging units 28, 27. The digital data is then generated onto a bus 37 via an IEEE-1394 interface 29, for example.

As described above, the player is able to determine whether the disc 18 contains data recorded through authorized copying, based on the watermark and CCI contained in the data, and reproduce the data. When the disc 18 is used again as a contents supply medium in a general purpose system capable of recording, reproducing, and controlling copying as indicated in Table, the information relating to permission/prohibition of copying as intended by the original contents supplier can be properly inherited in the form of media mark, watermark and CCI. In the presence of these pieces of information, unauthorized copying will not be unlimitedly repeated against the intention of the contents creator, no matter whether digital copying is performed on analog signals or digital broadcasting waves.

As described above, according to the present invention, a watermark is added to source information, so that appropriate copy control can be performed by making judgments on the watermark in combination of copy control information, so as to reflect the intention of the supplier of contents.

What is claimed is:

1. A digital recording apparatus that receives an analog signal containing at least one of picture and voice information, through an analog transmission line, and digitally records the analog signal, comprising:

an electronic watermark information detecting device that detects presence and content of electronic watermark information contained in a first portion of the received analog signal comprising said at least one of picture and voice information, said electronic watermark information indicating permission of free copying or prohibition of copying;

a recording device that digitally records the analog signal received through said analog transmission line; and a control device that controls said recording device so as to allow the recording device to digitally record the analog signal in a form containing the electronic watermark information within the first portion of the analog signal while adding copy control information indicating permission of free copying to a second portion of the analog signal that does not include said at least one of picture and voice information when the electronic watermark information detected by said electronic watermark information detecting device indicates permission of free copying, prohibit said recording device from digitally recording the received analog signal when the electronic watermark information detected by said electronic watermark information detecting device indicates prohibition of copying, and allow said recording device to digitally record the received analog signal while adding copy control information indicating prohibition of subsequent recording to the second portion of the analog signal when no electronic watermark information is detected by said electronic watermark information detecting device.

2. A digital recording apparatus connected to a receiver system that receives a digital broadcasting wave signal containing at least one of picture and voice information, for digitally recording the digital broadcasting wave signal received by the receiver system, comprising:

an electronic watermark information detecting device that detects presence and content of electronic watermark information contained in a first portion of the digital broadcasting wave signal comprising said at least one of picture and voice information, said electronic watermark information indicating permission of free copying or prohibition of copying;

a copy control information determining device that determines a content of copy control information that indicates a copy restriction level, said copy control information being contained in a second portion of the received digital broadcasting wave signal that does not include said at least one of picture and voice information; and a recording device that digitally records the received digital broadcasting wave signal; and a control device that controls said recording device so as to digitally record the received digital broadcasting wave signal in a form containing the electronic watermark information and the copy control information, according to the copy restriction level determined by said copy control information determining device when the electronic watermark information indicating permission of free copying or prohibition of copying is detected by said electronic watermark information detecting device, and digitally record the received digital broadcasting wave signal in a form containing the copy control information, according to the copy restriction level determined by said copy control information determining device when said electronic watermark information detecting device detects no electronic watermark information in the received digital broadcasting wave signal.

3. A digital recording apparatus according to claim 2, wherein the copy control information indicates one of copy restriction levels representing permission of free copying, permission of one-generation copying, and prohibition of copying.

4. A recording apparatus according to claim 3, wherein said control device controls said recording device such that said recording device digitally records the received digital broadcasting wave signal along with the electronic watermark information and the copy control information both indicating permission of free copying when the electronic watermark information detected by said electronic watermark information detecting device indicates permission of free copying and the copy restriction level determined by said copy control information determining device indicates permission of copying, said recording device digitally records the received digital broadcasting wave signal along with the electronic watermark information while changing the copy control information into that indicating prohibition of copying when the electronic watermark information detected by the electronic watermark information detecting device indicates prohibition of copying and the copy restriction level determined by the copy control information determining device indicates permission of one-generation copying, and said recording device is inhibited from digitally recording the received digital broadcasting wave signal when the electronic watermark information detected by the electronic watermark information detecting device indicates prohibition of copying and the copy restriction level determined by the copy control information determining device indicates prohibition of copying.

5. A digital recording apparatus according to claim 3, wherein said control device controls said recording device such that said recording device digitally records the received digital broadcasting wave signal without electronic watermark information while containing the copy control information indicating permission of copying when no electronic watermark information is detected by said electronic watermark information detecting device and the copy restriction level determined by said copy control information determining device indicates permission of copying, said recording device digitally records the received broadcasting signal without electronic watermark information while changing the copy control information into that indicating prohibition of copying when no electronic watermark information is detected by said electronic watermark information detecting device and the copy restriction level determined by the copy control information determining device indicates permission of one-generation copying, and said recording device is inhibited from digitally recording the digital broadcasting wave signal when no electronic watermark information is detected by said electronic watermark information detecting device and the copy restriction level determined by the copy control information determining device indicates prohibition of copying.

6. A digital recording method of receiving an analog signal containing at least one of picture and voice information, through an analog transmission line, and digitally recording the analog signal, comprising the steps of:

detecting presence and content of electronic watermark information contained in a first portion of the received analog signal comprising said at least one of picture and voice information, said electronic watermark information indicating permission of free copying or prohibition of copying;

digitally recording the received analog signal in a form containing the electronic watermark information within the first portion of the analog signal while adding copy control information indicating permission of free copying to a second portion of the analog signal that does not include said at least one of picture and voice information when the electronic watermark information detected in the step of detecting electronic watermark information indicates permission of free copying;

inhibiting digital recording of the received analog signal when the electronic watermark information detected in the step of detecting electronic watermark information indicates prohibition of copying; and digitally recording the received analog signal while adding copy control information indicating prohibition of subsequent recording to the second portion of the analog signal when no electronic watermark information is detected in the step of detecting electronic watermark information.

7. A digital recording method of digitally recording a digital broadcasting wave signal that is received by a receiver system, said digital broadcasting wave signal containing at least one of picture and voice information, comprising the steps of:

detecting presence and content of electronic watermark information contained in a first portion of the received digital broadcasting wave signal comprising said at least one of picture and voice information, said electronic watermark information indicating permission of free copying or prohibition of copying;

determining copy control information that indicates a copy restriction level and is contained in a second portion of the received digital broadcasting wave signal that does not include said at least one of picture and voice information; and digitally recording the received digital broadcasting wave signal in a form containing the electronic watermark information and the copy control information, according to the copy restriction level determined in the step of determining copy control information when the electronic watermark information indicating permission of free copying is detected in the step of detecting electronic watermark information; and digitally recording the digital broadcasting wave signal in a form containing the copy control information, according to the copy restriction level determined in the step of determining copy control information when no electronic watermark information is detected in the received digital broadcasting wave signal in the step of detecting electronic watermark information.

8. A digital recording method according to claim 7, wherein the copy control information indicates one of copy restriction levels representing permission of free copying, permission of one-generation copying, and prohibition of copying.

9. A digital recording method according to claim 8, wherein the step of digitally recording the received digital broadcasting wave signal comprises digitally recording the digital broadcasting wave signal along with the electronic watermark information and the copy control information both indicating permission of copying when the electronic watermark information detected in the step of detecting electronic watermark information indicates free copying and the copy restriction level determined in the step of determining copy control information indicates permission of copying, digitally recording the digital broadcasting wave signal along with the electronic watermark information while changing the copy control information into that indicating prohibition of copying when the electronic watermark information detected in the step of detecting electronic watermark information indicates prohibition of copying and the copy restriction level determined in the step of determining copy control information indicates permission of one-generation copying, and inhibiting digital recording of the digital broadcasting wave signal when the electronic watermark information detected in the step of detecting electronic watermark information indicates prohibition of copying and the copy restriction level determined in the step of determining copy control information indicates prohibition of copying.

10. A digital recording method according to claim 8, wherein the step of digitally recording the received digital broadcasting wave signal comprises digitally recording the digital broadcasting wave signal without electronic watermark information while containing the copy control information indicating permission of copying when no electronic watermark information is detected in the step of detecting electronic watermark information and the copy restriction level determined in the step of determining copy control information indicates permission of copying, digitally recording the broadcasting signal without electronic watermark information while changing the copy control information into that indicating prohibition of copying when no electronic watermark information is detected in the step of detecting electronic watermark information and the copy restriction level determined in the step of determining copy restriction level indicates permission of one-generation copying, and prohibiting digitally recording of the digital broadcasting wave signal when no electronic watermark information is detected in the step of detecting electronic watermark information and the copy restriction level determined in the step of determining copy control information indicates prohibition of copying.

* * * * *